US006952215B1

(12) United States Patent
Devins et al.

(10) Patent No.: US 6,952,215 B1
(45) Date of Patent: Oct. 4, 2005

(54) METHOD AND SYSTEM FOR GRAPHICS RENDERING USING CAPTURED GRAPHICS HARDWARE INSTRUCTIONS

(75) Inventors: Robert J. Devins, Essex Junction, VT (US); Paul M. Schanely, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/283,386

(22) Filed: Mar. 31, 1999

(51) Int. Cl.$^7$ ............................................. G06T 15/00
(52) U.S. Cl. ....................... 345/522; 345/503; 345/553; 719/323; 719/328
(58) Field of Search ................................. 345/501, 503, 345/522, 530, 553; 709/320–323, 328

(56) References Cited

U.S. PATENT DOCUMENTS

| | | | | |
|---|---|---|---|---|
| 5,276,798 A | * | 1/1994 | Peaslee et al. ............... | 395/505 |
| 5,657,479 A | * | 8/1997 | Shaw et al. .................. | 345/526 |
| 5,659,407 A | * | 8/1997 | Andresen et al. ............ | 358/530 |
| 5,675,773 A | * | 10/1997 | Devic .......................... | 345/522 |
| 5,724,494 A | | 3/1998 | Politis ......................... | 395/134 |
| 5,754,750 A | | 5/1998 | Butterfield et al. .......... | 395/118 |
| 5,793,937 A | | 8/1998 | Chura et al. ................. | 395/115 |
| 5,969,728 A | * | 10/1999 | Dye et al. .................... | 345/515 |
| 5,995,113 A | * | 11/1999 | Mitchell et al. ............. | 345/440 |
| 6,222,542 B1 | * | 4/2001 | Poreh et al. ................. | 345/346 |

FOREIGN PATENT DOCUMENTS

| | | |
|---|---|---|
| JP | PUPA61-150059 | 7/1986 |
| JP | 61-150059 | 8/1986 |
| JP | PUPA63-062079 | 3/1988 |
| JP | 63-062079 | 3/1988 |
| JP | PUPA5-290147 | 11/1993 |
| JP | PUPA9-27042 | 1/1997 |
| JP | 09-027042 | 1/1997 |
| JP | PUPA9-062852 | 3/1997 |
| JP | 09-062852 | 7/1997 |
| JP | PUPA9-319882 | 12/1997 |
| JP | 09-319882 | 12/1997 |
| JP | PUPA10-069548 | 3/1998 |
| JP | 10-069548 | 10/1998 |
| JP | PUPA10-275248 | 10/1998 |

OTHER PUBLICATIONS

J. Neider, T. Davis, and M. Woo, OpenGLTM Programming Guide: The Official Guide to Learning OpenGL, Release 1, Addison–Wesley Publishing Company 1993.*

* cited by examiner

*Primary Examiner*—Ulka J. Chauhan
(74) *Attorney, Agent, or Firm*—Connolly Bove Lodge & Hutz LLP; Richard M. Kotulak; Larry J. Hume

(57) ABSTRACT

A computer-implemented method and system for performing graphics rendering on demand on a graphics subsystem, with only nominal host system operations being required. An application program requiring graphics to be rendered is coded to bound a sequence of calls to basic rendering functions, defining a desired image to be rendered, between begin-program and end-program identifiers. When the application program is executed on a host operating system, a begin-program identifier invokes a function in a graphics device driver in the host system. The function captures the calls to the rendering functions within the application program in a memory as hardware instructions to the graphics subsystem. When the function encounters an end-program identifier, it registers the captured hardware instructions with the host system as an executable program. Subsequently, the application may render the image upon demand by calling the registered executable program, which will execute from the memory on the graphics subsystem, with only nominal host processor operations being required. Thus, host processor operations and memory normally required for performing graphics rendering are conserved.

25 Claims, 3 Drawing Sheets

METHOD AND SYSTEM FOR GRAPHICS RENDERING USING CAPTURED GRAPHICS HARDWARE INSTRUCTIONS

CROSS REFERENCE TO RELATED APPLICATIONS

Application Ser. No. 09/283,397 filed on even date herewith, assigned to International Business Machines Corporation, and having common inventorship.

BACKGROUND OF THE INVENTION

The present invention relates to computer graphics systems, and in particular to a method and system for increasing graphics rendering speed and efficiency by offloading rendering operations from a host processor onto a register-based graphics subsystem which can perform graphics rendering on demand with only nominal host processor operations being required.

Generally, computer graphic images are produced by transferring pixel definitions (intensity and color), stored in a memory location known as a frame buffer, to a display screen. Presently, most display systems are raster-based, which means that a value stored in the frame buffer determines the intensity and color of an electron beam at a given pixel, as the beam scans the phosphor-coated inner surface of a display screen at a suitable frequency.

The process of transforming a set of image definitions in program code into a set of pixel values which can be physically displayed on a CRT, and subsequently scanning the pixel values onto a CRT, is often referred to as "rendering". In rendering, a processor must take specifications of graphical primitives, which are the basic building blocks for more complex images, from within an application program and convert them into pixel definitions.

Application programs requiring graphics operations to be performed typically call basic rendering functions for rendering primitives, such as lines, circles and polygons. These basic rendering functions are written in low-level code and reside in a graphics library. A set of basic rendering functions is known as an Application Programmer's Interface (API), and allows programmers to write graphics applications in a high-level language such as C or Fortran in terms of these basic functions, without the need for writing low-level code. Some standardized and commercially-available API's include OpenGL, PHIGS (Programmers Hierarchical Graphics Standard), and GKS (Graphical Kernel System).

In order for an image to be rendered, the high-level API specifications within an application program must be interpreted and reduced to hardware-level code. Then, this hardware-level code must be executed to perform the actual physical I/O operations required to fill or modify a frame buffer.

Even with simple images, these tasks can consume significant portions of processor time and system memory. However, graphics applications are becoming increasingly more sophisticated, requiring complex, realistic images to be rendered in color, with lighting, shadow and the like. If certain images are required to be generated repetitively, for example, in the case of a video game, the high demands on processor time and system memory can slow image rendering and frustrate users.

Thus, an approach to rendering is called for that can offload repetitive tasks from a host processor, freeing it to perform other necessary tasks. Specifically, host processor cycles and memory would be conserved, and rendering speed increased, if the host processor operations required to generate hardware-executable instructions from high-level API specifications in a graphics application program could be performed just once for an image required to be rendered repetitively, and the hardware-executable instructions could subsequently be executed on demand to render the image. Such an approach is not known to exist in the prior art.

SUMMARY OF THE INVENTION

The present invention provides a method and system for offloading rendering tasks from a host processor to a graphics subsystem which can perform the rendering tasks on demand. In the method and system according to the present invention, the hardware instructions to graphics hardware generated by the basic rendering functions called by a graphics application program are captured in memory. Once the hardware instructions are captured, they can be executed on a graphics subsystem to render an image upon demand with only nominal host processor operations being required.

Software according to the present invention is responsive to instructions within any graphics application program which defines a sequence of basic rendering functions to be captured as hardware instructions. The instructions in the application program are typically coded by a programmer wishing to exploit the advantages provided by the present invention, and may comprise a sequence of high-level calls to basic rendering functions in an API for rendering a particular image, bounded by begin-program and end-program identifiers.

In accordance with the preferred embodiment, when the application program executes, a begin-program identifier invokes the software of the present invention. The software executes instructions for generating the hardware instructions corresponding to the high-level calls to the basic rendering functions bounded between the begin-program and end-program identifiers. The hardware instructions are stored in a memory without being executed. Then, when the software encounters an end-program identifier, it registers the cumulative stored hardware instructions with a host system as an executable program.

Subsequently, whenever the application program requires the image to be rendered, it issues a call to the registered executable program, and the stored hardware instructions are executed within the graphics subsystem to render the image, with only nomimal host processor operations being required. Thus, host processor cycles are conserved and available to perform other tasks, and system memory requirements are reduced, since the hardware instructions corresponding to a sequence of basic rendering functions specified by an application program need only be generated once.

DETAILED DESCRIPTION OF THE INVENTION

Figure 1:
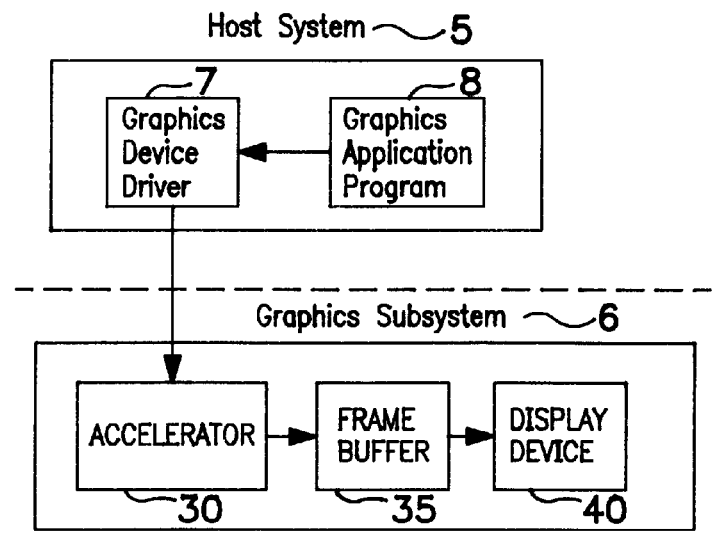
FIG. 1 shows a general overview of a prior art graphics rendering system.

FIG. 1 illustrates a conceptual overview of a prior art graphics rendering system. In the system shown in FIG. 1, a host operating system 5 has graphics device driver software 7, which, in response to high-level graphics rendering specifications in graphics application program 8, issues low-level instructions to graphics accelerator 30 in graphics subsystem 6. Under the control of the graphics device driver 7, accelerator 30 writes pixel definitions to frame buffer 35, which are scanned onto display device 40 to physically render an image.

Figure 2:
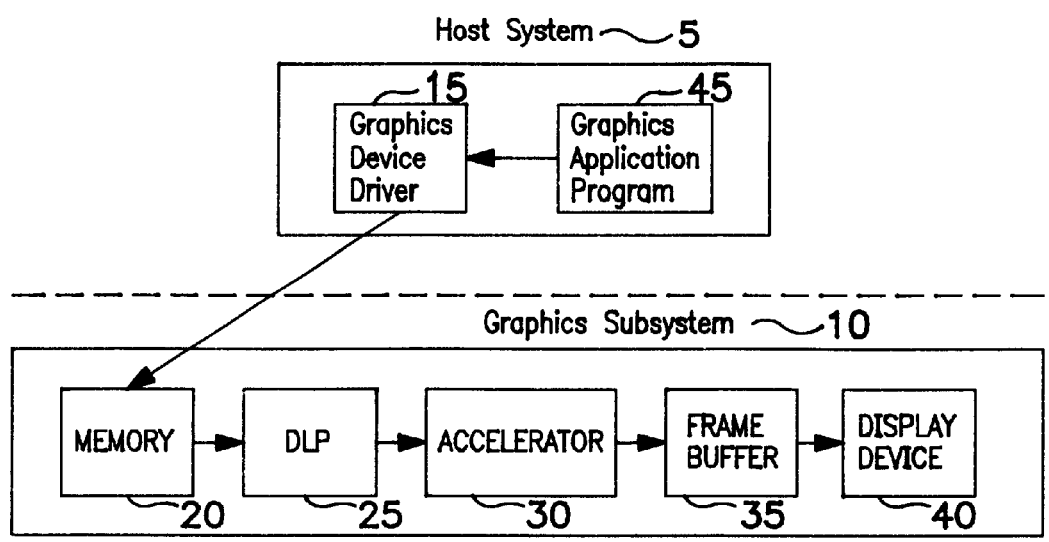
FIG. 2 shows the basic software and hardware components of a system for implementing the present invention.

By contrast, FIG. 2 shows basic software and hardware components in a method and system for graphics rendering according to the present invention. Elements include a graphics subsystem 10 comprising a random access memory 20, a custom graphics processor known as Display List Processor (DLP) 25, an accelerator 30, a frame buffer 25, and a display device 40, such as a CRT. The DLP 25 is capable of fetching hardware instructions stored in memory 20, and issuing the instructions to control the accelerator 30. The accelerator 30 includes high-speed registers that enable pixel definitions to be written to the frame buffer 35 in accordance with the instructions issued by DLP 25. The pixel definitions are then scanned from the frame buffer 35 onto the display device 40 to produce an image.

Figure 3:
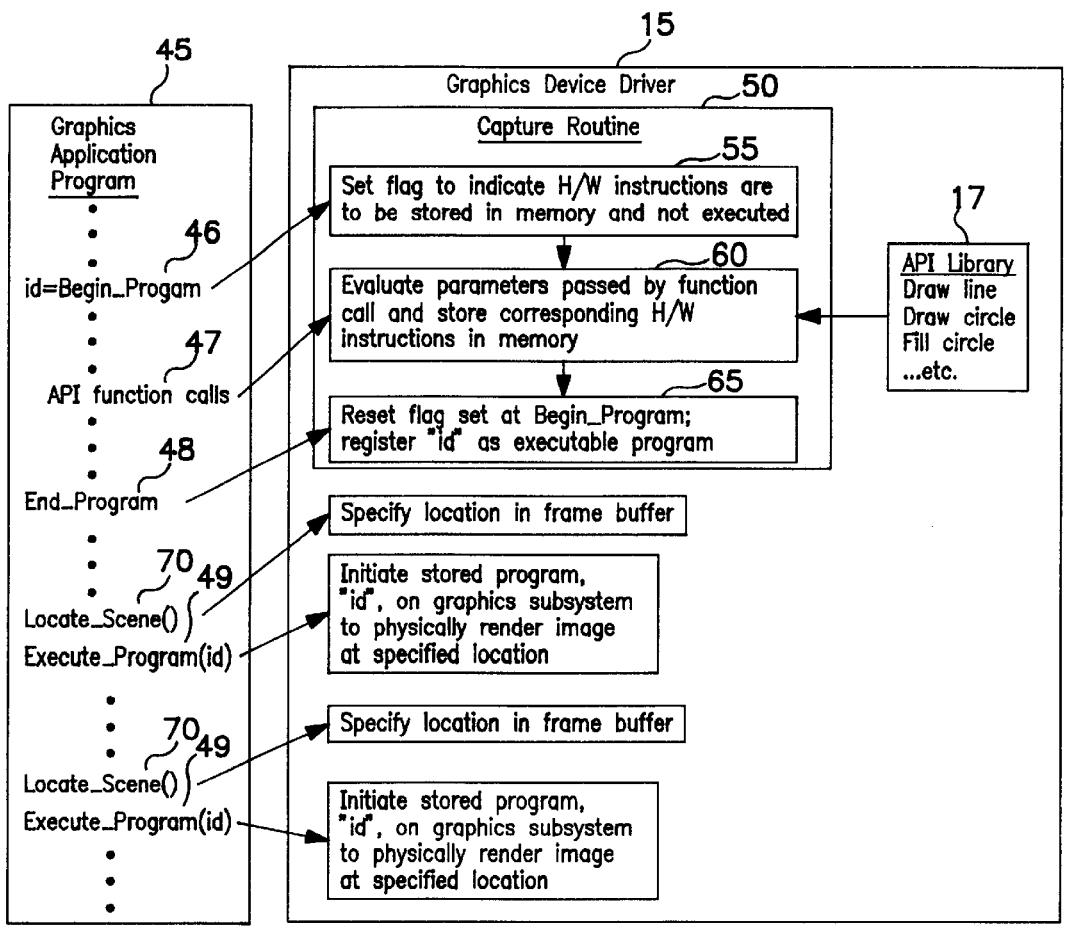
FIG. 3 shows the flow of a capture routine according to the present invention.

Referring now to both FIG. 2 and FIG. 3, computer-executable instructions for effecting the features of the present invention are implemented in the graphics device driver 15. The device driver 15 includes a capture routine 50 and an API set 17, that is, a set of basic rendering functions for rendering primitives. Each of the functions in the API comprises a sequence of computer-executable instructions at the hardware level, primarily register-write instructions for specifying, for example, the dimensions and color of a given primitive and its location within the frame buffer.

The functions in the API 17 may be invoked by instructions within higher-level programs, by specifying a function by its unique mnemonic identifier, for example, "Draw_Line", "Draw_Circle" or "Fill_Circle", and passing it the appropriate parameters, such as the length of the line, the radius of the circle or the fill color.

Capture routine 50 comprises computer-executable instructions for responding to instructions within a higher-level application program 45 executing on a host system 5, identifying a sequence of API function calls 47 to be pre-stored in a random access memory 20 as hardware instructions. The instructions within the higher-level program typically are coded by a programmer in an application program requiring graphics to be rendered, in order to invoke the advantageous features provided by the present invention.

The instructions in the higher-level application program 45 invoking the features of the invention comprise a "Begin_Program" 46 and "End_Program" 48 identifying pair, which enclose or bound a sequence of API function calls 47, coded by a programmer as calls by mnemonic identifier (along with required parameters) to particular rendering functions within the API set 17 provided in the device driver 15. The programmer codes the API sequence arbitrarily, in order to produce a desired image. The Begin_Program/End_Program bounding pair identify an API sequence to be pre-stored in a memory 20 as hardware instructions.

When a Begin_Program instruction 46 in an application program 45 is executed, a function call is issued to the capture routine 50 in the device driver code 15. FIG. 3 shows the basic flow of the capture routine. The sequence shown is initiated by a Begin_Program instruction 46 within an application program 45. First, as shown in block 55, the capture routine sets a flag instructing the device driver 15 to store hardware instructions generated by API function calls 47 in memory 20, rather than executing the hardware instructions by issuing them to accelerator 30. Thus, as shown in block. 60, API function calls 47 following the Begin_Program instruction 46 are evaluated to generate the corresponding hardware instructions, by passing programmer-specified parameters to the appropriate API in API library 17, and storing the API in memory 20. The API comprises fully machine-executable register instructions for writing to the frame buffer 35, for performing the particular rendering function specified by the programmer in the call parameters.

The capture routine 50 performs the operations indicated in block 60 for each API function call 47. During the capture routine, the device driver calculates and records the starting address and extent of the stored instructions in memory 20. Then, as shown in block 6S, when the application program 45 issues an End_Program instruction 48, the capture routine resets the flag set by the Begin_Program instruction 46, and registers the collective stored, hardware-executable instructions with the host system 5 as an executable program. The program may now be invoked using a unique mnemonic identifier, "id", which is a variable containing a number calculated by the device driver and returned to the application program 45. The "id" variable is usually given a meaningful name by the programmer in the Begin_Program instruction 46.

The device driver performs the foregoing process for each Begin-Program/End-Program pair within an application program 45. There may be numerous such pairs; however, once a bounded API sequence 47 is converted into hardware instructions, stored on a memory 20 and registered with the host system 5 as an executable program, it can be executed on demand by the graphics subsystem 10, without any requirement for the usual host processor, i.e. device driver, operations. As shown in FIG. 3, an application program 45 can render an image on a display screen as often as desired, simply by specifying its assigned mnemonic, "id", in an Execute_Program instruction 49. The Execute_Program instruction 49 causes the DLP 25 to read the hardware instructions corresponding to "id" stored in memory 20, and issue the instructions to the accelerator 30. The accelerator performs the register instructions to fill the frame buffer 35. The pixel definitions are then scanned from the frame buffer 35 onto the display device 40 to produce the desired image.

The only device driver operations required are to locate the image within the frame buffer 35 as specified in a Locate_Scene instruction 70, and then initiate the stored hardware instructions specified in the Execute_Program instruction 49 to physically render the image. The device driver operations that would otherwise be required to perform a sequence of API functions, by actually executing them each time they were needed by an application program, are unnecessary, freeing the host processor cycles and memory required for these operations for other uses.

The following is an illustrative example of an application of the present invention, where a programmer wants to generate an image of a car for a video game. The car image needs to be generated repetitively.

Typically, the programmer would work on a computer system including a host processor, memory, read/write disk storage, and I/O devices such as a keyboard and mouse allowing for user interaction with the operating system and software applications, including text editors for writing and editing software. The programmer would use a text editor to write or edit source code containing instructions recognizable by the device driver software of the present invention. To implement the present invention, the computer system would typically further require a graphics subsystem including the components illustrated in FIG. 2.

In the source code for the video game, the programmer would typically write program instructions defining a Begin-Program/End-Program pair to bound a sequence of API functions for rendering the components of the car image. For example, pseudo-code for bounding a sequence of API functions for rendering a tire component of the car might look as follows:

```
htire = Begin_Program( );   // define a stored program to render
                            // a rudimentary tire;
Draw_Circle(100);           // draw the outline of the tire;
Fill_Circle(Black);         // fill the circle with black;
Draw_Circle(10);            // draw a smaller circle directly in
                            // the middle of the tire;
Fill_Circle(Silver);        // give it a chrome center;
End_Program( );             // save the hardware instructions for
                            // rendering a tire;
```

In this example, the first instruction, "htire=Begin_Program( )" marks the beginning of a sequence of API functions to be converted into hardware instructions and stored in a memory according to the method of the present invention. The mnemonic "htire" is arbitrarily assigned by the programmer and represents a variable containing a number calculated the device driver 15 and used to identify and track the stored program to be generated.

The subsequent instructions, "Draw_Circle(100)" (note that "100" is a function parameter here and not a reference numeral), "Fill_Circle(Black)", "Draw_Circle(10)" and "Fill_Circle(Silver)" represent calls to functions within the API 17 for rendering primitives. Here, the API functions will render a black circle with a smaller silver circle in the center, to represent a tire.

The last line, "End_Program( )", marks the end of an API sequence to be stored.

The video game source code would be similarly edited to bound API sequences for rendering the car's body, windows, bumpers and so on.

Typically, to best realize the advantages afforded by the present invention, a programmer would identify all the API sequences to be pre-stored as hardware instructions as above, as a preliminary or initialization stage of the execution of the application program. Source code for executing the hardware instructions once they have been stored would follow this initialization stage. In the car example, pseudo-code for executing the stored hardware instructions might look as follows:

```
Locate_Scene(front);        // locate where the front tire will
                            // be drawn;
Execute_Program(htire);     // the entire tire is rendered at
                            // the front of the car;
Locate_Scene(rear);         // locate where the rear tire will
                            // be drawn;
Execute_Program(htire);     // the entire tire is rendered at
                            // the rear of the car;
Locate_Scene(top);          // locate where the body of the car
                            // will be drawn;
Execute_Program(hbody);     // draw the car's body ("hbody" is a
                            // pre-stored program, like "htire")
```

After being edited to identify and execute pre-stored API sequences as above, the video game source code would be saved to a storage device for subsequent execution.

Figure 4:
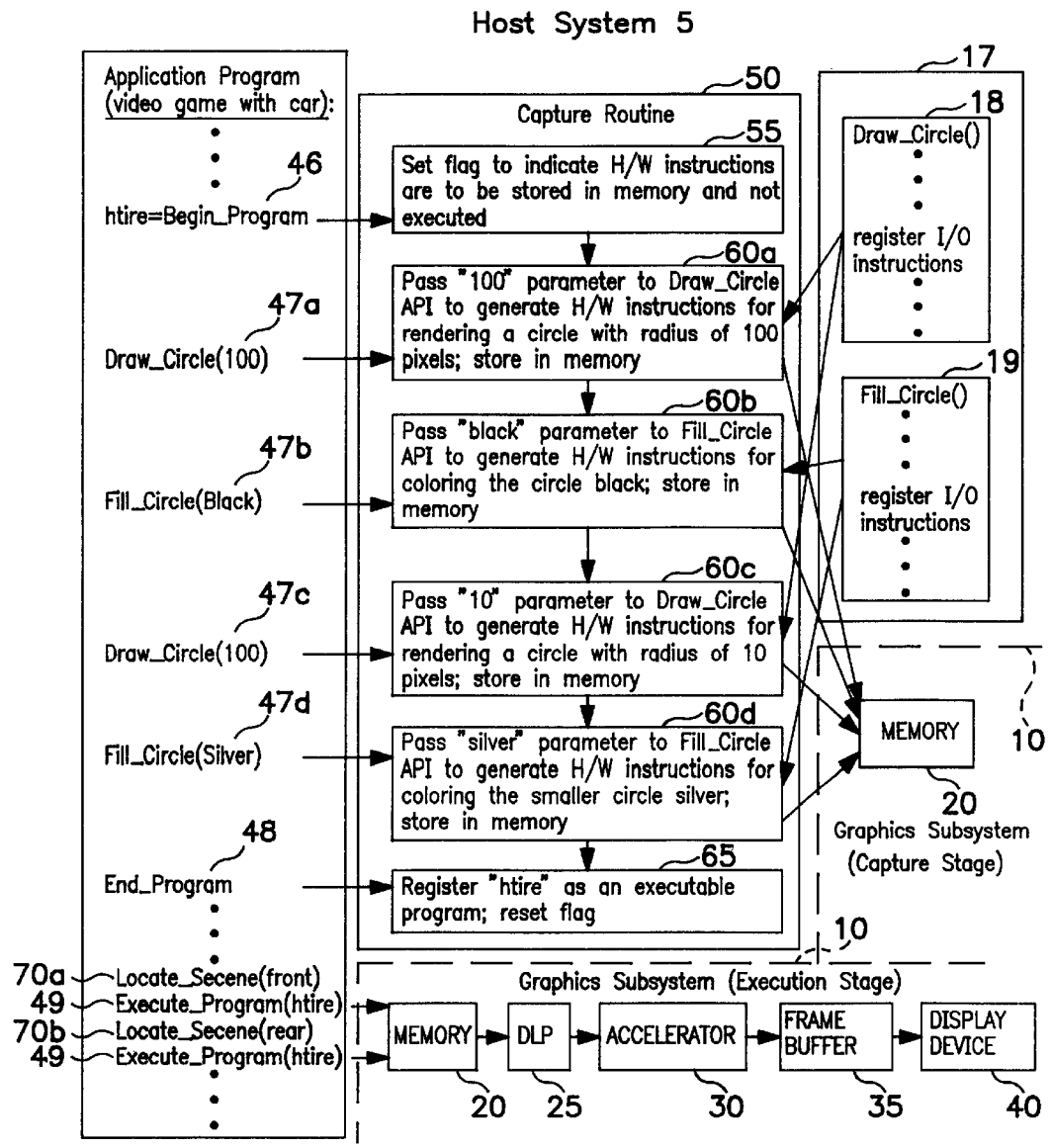
FIG. 4 shows an example of an application program utilizing the present invention.

FIG. 4 illustrates the execution of the above example program (the rendering of the car body is not shown). The program executes as a graphics application program 45 within a host system 5. The execution of the instruction "htire=Begin_Program" 46 results in a function call to the capture routine 50, and initiates the basic process shown in FIG. 3. The process flow is shown in FIG. 4 for the particular example under discussion.

First, capture routine 50 sets a flag to indicate that the hardware instructions corresponding to API function calls 47 are to be stored in memory 20 rather than executed. Thus, as shown in block 60a, the API call "Draw_Circle(100)" 47a causes the capture routine to execute instructions for generating and storing the corresponding hardware instructions. To do so, the capture routine passes the programmer-specified parameter "100" defining the desired circle radius to the basic rendering function "Draw_Circle( )" 18, comprising register I/O instructions, and stores the register instructions in the memory 20.

Then, as shown in block 60b, in response to the next instruction, "Fill_Circle(Black)" 47b, the capture routine generates the hardware instructions for filling the circle with black, by passing the color parameter "Black" to the basic rendering function "Fill_Circle( )" 19, and storing the register instructions in memory 20.

Blocks 60c and 60d respond similarly to API specifications 47c and 47d.

Then, the application program issues the End_Program instruction 48, and the capture routine responds as shown in block 65. The flag set by the Begin_Program instruction is reset, and the collective hardware instructions stored in memory 20 during the foregoing process are registered with the host system 5 as the executable program "htire".

The application program 45 continues executing. All the hardware-level instructions necessary for rendering an image of a tire are now stored as executable program "htire" in memory 20. Thus, subsequently, whenever the application program wants to render the tire on a display device 40, it simply issues the "Execute_Program(htire)" instruction 49 as often as it needs to, and the graphics subsystem renders the tire without the need for any device driver operations other than to locate the image as specified in the Locate_Scene instructions 70a and 70b, and then initiate the stored hardware instructions specified in the Execute_Program instruction 49 to physically render the image. In response to the Execute_Program instruction 49, the DLP 25 reads the hardware instructions corresponding to "htire" stored in memory 20, and issues the instructions to accelerator 30. The accelerator performs the register instructions to fill the frame buffer 35. The pixel definitions are then scanned from the frame buffer 35 onto the display device 40 to produce the tire image.

In the car-rendering example above, Locate_Scene(front) 70a and Locate_Scene(rear) 70b pseudo-code instructions represent the operations of specifying a frame buffer location for the rendering of a tire using captured hardware instructions. A complex scene, a car, was composed by assembling the components of tires, body, etc., at the locations specified in the Locate_Scene instructions.

It would also have been possible to render the car by nesting Execute_Program instructions. For example, a main program called "hcar" could have been constructed which comprised Execute_Program instructions invoking "htire", "hbody", and so on. These Execute_Program instructions would be preceded by Locate_Scene_Object instructions, which specify where, relative to a primary scene, an object within the primary scene is to be rendered. Then, when "hcar" was captured, the entire car could be rendered with a single Execute_Program(hcar) instruction.

As illustrated by the car-rendering example, an advantage provided by the present invention is the ability to efficiently compose complex scenes by utilizing simpler, relocatable subscenes captured as hardware instructions according to the method and system described above. A primary scene location within a frame buffer can be specified, and then a complex scene can be rapidly rendered using captured hardware instructions to place subscenes within the primary scene.

A further refinement of this feature can be obtained by capturing the Locate_Scene operation itself, along with a relocatable subscene, as hardware instructions. An illustrative example is shown in the following pseudo-code:

```
// Create a relocatable subscene containing a diagonal
// line near the bottom right corner
hprog = Begin_Program( )       // initiate capture routine to
                                // create a stored program
                                // called "hprog";
Locate Scene Object(20, 20)    // generate and store
                                // hardware instructions for
                                // locating an object at
                                // coordinates (20, 20) relative
                                // to specified primary scene
                                // coordinates;
Draw_in_Object(0, 0, 10, 10)   // generate and store
                                // hardware instructions for
                                // rendering a diagonal line of
                                // 10 pixels;
End Program(hprog)              // end capture routine and
                                // register "hprog" as an
                                // executable program with host
                                // system
```

When coded in an application program 45 and executed on a host system 5 as shown in FIGS. 2 and 3, the above pseudo-code would create a stored program consisting of hardware instructions on a memory 20, which when executed by a DLP 25, would render a diagonal line of 10 pixels at a frame buffer location having Cartesian (x,y) coordinates of (20,20), relative to specified coordinates in a primary scene.

The following pseudo-code shows an example of using the captured program "hprog" to efficiently relocate and render a subscene within a primary scene:

```
Locate_Scene(primary_scene, 0, 0)    // locate a subscene at
                                      // coordinates (0, 0) within a
                                      // primary scene;
Execute_Program(hprog)                // render subscene (diagonal
                                      // line of 10 pixels) at
                                      // (20, 20) relative to (0, 0)
                                      // using captured hardware
                                      // instructions;
Locate_Scene(primary_scene, 55, 59)  // locate a subscene at
                                      // coordinates (55, 59) within a
                                      // primary scene;
Execute_Program(hprog)                // render subscene (diagonal
                                      // line of 10 pixels) at (20, 20)
                                      // relative to (55, 59), using
                                      // captured hardware
                                      // instructions
```

The above example pseudo-code, when executed within an application program 45, would cause DLP 25 to execute the captured hardware instructions "hprog" to render a subscene consisting of a diagonal line of 10 pixels at coordinates (20,20) and at coordinates (75,79) within a primary scene identified by "primary_scene".

The inventive concept described in the foregoing has a broad range of possible applications, and may be used to generate stored, reusable hardware-level instructions from various types of higher-level computer program instruction sequences, as specified by an application programmer. The stored hardware instructions may then be executed on a subsystem with minimal operations being required by a host operating system, to reduce demand on host processor cycles and memory.

As described earlier, the present invention may advantageously be embodied as computer-executable instructions within a graphics device driver of a graphics subsystem. For implementation, the device driver code may reside on any computer-usable medium at a suitable location, for example, in a computer memory as a fully-linked subroutine of a host operating system. When not being actively implemented, the code may reside on portable computer-usable media such as tape, floppy disks, hard disks, CD-ROMs and the like.

The foregoing description of the invention illustrates and describes the present invention. Additionally, the disclosure shows and describes only the preferred embodiments of the invention, but it is to, be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for performing graphics rendering, comprising:

capturing, in a memory as an executable program, hardware-level instructions generated by a device driver in response to basic rendering functions called by a graphics application program running in a host operating system; and defining said captured hardware-level instructions as an executable program to the host operating system, wherein said hardware-level instructions are captured in the memory separate from the host operating system.

2. The method of claim 1, wherein said capturing includes:

responding to instructions within a graphics application program bounding a sequence of basic rendering functions, by generating the hardware-level instructions corresponding to said rendering functions; and storing said hardware-level instructions in a memory.

3. The method of claim 1, wherein said hardware-level instructions are generated by passing user-specified parameters to basic rendering functions obtained from a collection of such functions.

4. The method of claim 1, further comprising executing the captured hardware-level instructions, upon demand on a graphics subsystem, to render an image.

5. The method of claim 4, wherein said executing includes:

utilizing a graphics processor to issue the captured hardware-level instructions from the memory; and utilizing a graphics accelerator to receive said captured hardware-level instructions and to write pixel information derived from the captured hardware-level instructions to a frame buffer, to render an image.

6. The method of claim 4, further comprising re-executing the captured hardware-level instructions upon another demand on the graphics subsystem, to again render the image.

7. A computer system for performing graphics rendering comprising:

a host operating system; and a graphics subsystem including hardware for performing rendering operations;

wherein said host operating system includes software comprising computer-executable instructions for responding to instructions issued by a graphics application program running in the host operating system to capture, in a memory as an executable program, hardware-level instructions to the graphics subsystem generated by a device driver in response to basic rendering functions called by the graphics application program, wherein said captured hardware-level instructions are defined as an executable program to the host operating system by said software, and wherein the memory is separate from the host operating system.

8. The computer system of claim 7, wherein said software captures said hardware-level instructions by:

responding to instructions within said graphics application program bounding a sequence of basic rendering functions, by generating hardware-level instructions corresponding to said rendering functions; and storing said hardware-level instructions in the memory.

9. The computer system of claim 7, wherein said hardware-level instructions are generated by passing user-specified parameters to basic rendering functions obtained from a collection of such functions.

10. The computer system of claim 7, wherein said hardware for performing graphics rendering includes:

a graphics processor for issuing the captured hardware-level instructions from the memory; and a graphics accelerator for receiving said captured hardware-level instructions and for writing pixel information derived from said captured hardware-level instructions to a frame buffer, to render an image.

11. A computer-usable medium embodying computer-executable program code for implementing a method for performing graphics rendering, said code comprising instructions responsive to instructions within a graphics application program running in a host operating system to capture, in a memory as an executable program, hardware-level instructions generated by a device driver in response to basic rendering functions called by the graphics application program, wherein said captured hardware-level instructions are defined as an executable program to the host operating system, and wherein the memory is separate from the host operating system.

12. The computer-usable medium of claim 11, wherein said code includes instructions for:

responding to instructions within a graphics application program bounding a sequence of basic rendering functions, by generating the hardware-level instructions corresponding to said rendering functions; and storing said hardware-level instructions in the memory.

13. The computer-usable medium of claim 11, wherein said hardware-level instructions are generated by passing user-specified parameters basic rendering functions obtained from a collection of such functions.

14. The computer-usable medium of claim 11, wherein said code includes instructions for controlling a graphics processor to issue the captured hardware-level instructions from the memory to a graphics accelerator.

15. A method for performing high-level computer program instruction sequences using reusable hardware-level instructions executable on demand on a subsystem of a host operating system, comprising:

capturing, in a memory as an executable program, reusable hardware-level instructions to the subsystem generated by a device driver in response to the high level instructions issued by the application program;

defining said captured hardware-level instructions as an executable program to the host operating system; and executing the captured hardware instructions upon demand on the subsystem, wherein the memory is separate from the host operating system.

16. The method of claim 15, wherein said capturing includes:

responding to identifying instructions within an application program bounding a sequence of high-level instructions, by generating hardware-level instructions corresponding to said high-level instructions; and storing said hardware-level instructions in a memory.

17. The method of claim 15, wherein said hardware-level instructions are generated by passing user-specified parameters to hardware-level functions obtained from a collection of such functions.

18. A method for performing graphics rendering, comprising:

defining a sequence of basic rendering functions in a graphics application program as a sequence to be captured in a memory as hardware-level instructions, wherein the graphics application program is running in a host operating system and the memory is separate from the host operating system;

executing the graphics application program containing the defined sequence, to produce the captured hardware-level instructions; and defining said stored hardware-level instructions as an executable program to the host operating system.

19. The method of claim 18, wherein said defining step includes:

bounding a sequence of basic rendering functions between identifiers for invoking the capturing process.

20. The method of claim 19, wherein said executing the graphics application program is performed on a host operating system having a graphics subsystem, and including software comprising instructions for:

responding to said identifiers within said graphics application program bounding a sequence of basic rendering functions, by generating hardware-level instructions to graphics hardware corresponding to said rendering functions; and storing said hardware-level instructions in the memory.

21. The method of claim 18, further comprising executing the captured hardware-level instructions to render an image.

22. A method for performing graphics rendering comprising the steps of:

capturing, in a memory as an executable program, hardware-level instructions generated by a device driver in response to a sequence of basic rendering functions called by a graphics application program running in a host operating system, said sequence defining a subscene; and specifying a location within a primary scene for said subscene to be rendered, wherein said memory is separate from the host operating system.

23. The method of claim 22, further comprising executing said captured instructions to render said subscene at the specified location.

24. A computer-usable medium embodying computer-executable program code for implementing a method for performing graphics rendering, comprising:

capturing, in a memory as an executable program, hardware-level instructions generated by a device driver in response to a sequence of basic rendering functions called by a graphics application program running in a host operating system, said sequence defining a subscene; and specifying a location within a primary scene for said subscene to be rendered, wherein said memory is separate from the host operating system.

25. The computer-usable medium embodying computer-executable program code for implementing a method for performing graphics rendering of claim 24, wherein the method further comprises executing said captured instructions to render said subscene at the specified location.

* * * * *